Feb. 5, 1946.   W. H. HUNTER   2,394,063
PROTECTIVE COVERING FOR AIRCRAFT SURFACES AND THE LIKE
Filed Dec. 3, 1943
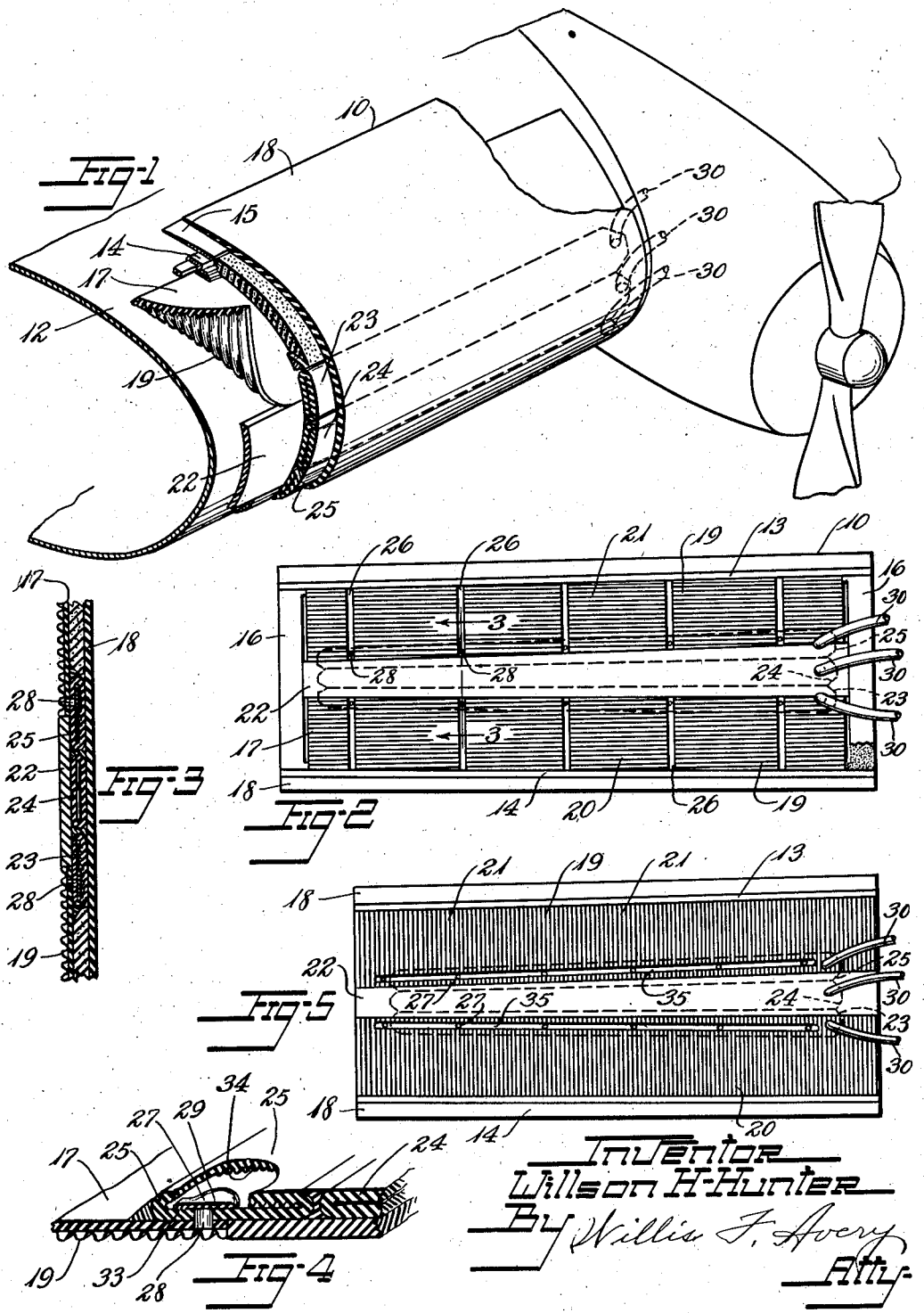
Inventor
Willson H. Hunter
By Willis F. Avery
Atty.

Patented Feb. 5, 1946

2,394,063

UNITED STATES PATENT OFFICE 2,394,063

PROTECTIVE COVERING FOR AIRCRAFT SURFACES AND THE LIKE

Willson H. Hunter, Lakewood, Ohio, assignor to The B. F. Goodrich Company, New York, N. Y., a corporation of New York Application December 3, 1943, Serial No. 512,718

7 Claims. (Cl. 244—134)

This invention relates to protective coverings for the surfaces of structure such, for example, as aircraft and other vehicles, and is especially useful in its application to inflatable protective coverings for preventing accumulation of ice on the leading edge of wings and other airfoils and surfaces.

An airfoil, for example a wing of an aircraft in flight, may be functioning under cruising, driving, climbing and stalling conditions respectively, with accompanying variation in the aerodynamic forces at the leading edge of the airfoil and especially in the area of negative pressure produced by the airfoil. When the wing is provided with an inflatable protective covering of flexible material, such, for example, as resilient rubber-like material, this variation in aerodynamic forces tends at times to cause portions of the covering to lift away or to bulge objectionably from the wing surface in areas in which is not secured directly to such surface.

By the present invention provision is made for removing the air from beneath the covering, thus increasing the adherence of the wing cover to the wing surface and eliminating the possibility of its lifting or bulging away from the wing.

The withdrawal of the air beneath from the covering is effected in a positive manner by suction which may be applied through a chamber of the covering. Thus strong suction can be utilized which is independent of variable external pressure upon the covering.

The chief objects of the invention are to provide effectively for venting air from beneath the outer surface of the covering, to provide for effecting suction through the interior of the covering itself, to provide for utilizing the chamber of an inflatable covering during the intervals between inflations for applying the suction to the inner face of the covering, to provide this action while providing also against the transmission of pressure fluid from the chamber to the under face of the covering, and to accomplish these results without requiring modification of the wing surface or other structure upon which the covering is mounted.

These and other objects and advantages will be apparent from the following description, reference being made to the accompanying drawing, in which:

Fig. 1 is a perspective view, with parts broken away, of an airplane wing and a wing covering constructed in accordance with and embodying the invention.

Fig. 2 is a bottom plan view of the covering of Fig. 1, before its application to the wing.

Fig. 3 is a sectional view taken along line 3—3 of Fig. 2.

Fig. 4 is an enlarged perspective view with parts broken away of the valving portion of the covering.

Fig. 5 is a bottom plan view showing a modified construction.

In the embodiment of the invention shown in Figs. 1 to 4 an inflatable protective covering or shoe 10 of elastic construction is mounted upon an airfoil 12, such, for example, as an aircraft wing, the covering being preferably in a stretched condition chordwise of the wing and secured to the wing surface or its internal structure along upper and lower attaching margins 13 and 14 extending spanwise of the wing. Metal fairing strips 15 may be provided at the attaching margins of the covering 10. End margins 16 and the upper and lower attaching margins 13 and 14 of the covering are adhered to the airfoil 12 as by a suitable adhesive, such, for example, as rubber cement, and the attaching margins 13 and 14 are sealed to the wing surface by a clamping action of the fairing strips 15.

The protective covering 10 includes inner and outer layers 17 and 18 of flexible material, such for example, as resilient rubber or other rubber-like material. The inner layer 17 has a plurality of rectilinear lands or ribs 19 on the inner face at upper and lower stretchable portions 20 and 21 of the covering and has a smooth inner face at a central distortable portion 22 of the covering, while the outer layer 18 has a smooth outer face and is continued over the fairing strips 15 to which it is adhered. The spanwise rectilinear channels between the lands 19 connect at intervals along their lengths with chordwise venting grooves 26. The covering also includes a plurality of inflatable tubes 23 to 25 preferably of resilient rubber or other rubber-like material which may be reinforced as by a distensible fabric, the tubes being sandwiched between the inner and outer layers 17 and 18, as shown, for example in Fig. 1 and extending spanwise along the covering in the distortable portion 22. In the arrangement shown the tubes 23 to 25 are placed spanwise and parallel and side-by-side chordwise to the wing surface, but any desired arrangement of tubes may be used.

During operation of the ice-removing cover 10 each of the tubes 23 to 25 is alternately inflated and deflated by means of a power operated pump acting through an automatic timing controller, for example of the type shown and described in my Patent No. 2,327,046. During inflation the tubes 23 to 25 are connected by means of suitable tubes 30 with the compression side of the pump and air is forced in, causing the tubes to become inflated. On the other hand, during intervals of deflation each tube is connected by the automatic timing controller with a source of suction which may be the exhaust side of the pump.

In accordance with the invention advantage is taken of the availability of the suction to exhaust the air not only from the tubes but also from the space between the surface of the airfoil 12 and the protective covering 10. This is accomplished through apertures 28 connecting the tube chambers with the venting grooves 26 at the under face of the covering by means of check valves 27 which open these apertures when the air pressure inside the tubes 23 and 25 is reduced by the pump to a degree lower than that under the protective covering 10. One form of check valve is shown in Fig. 4. It consists of a thin flap 29 of rubber or other flexible rubber-like material attached by vulcanization or by other suitable means as, for example, rubber cement for a small portion of its periphery as at 33 to the inside of the tube wall to function as a hinge. When pressure below the flap exceeds the pressure inside the tube the flap lifts about its hinge away from the inner surface of the tube and the aperture 28. When air is forced into the tube by the pump the pressure becomes greater on the tube side of the flexible valve flap than on the side next the opening 28. This causes the flap to seat firmly over the opening 28 and prevents passage of air from inside the tube through the opening 28 to the inner face of the covering.

In order to prevent sealing off of part of the tube area around the openings 28 because of contact of portions of the tube surface through collapse of the tube wall, a portion of the wall of the tube in the vicinity of the opening 28 may be constructed with ribs or lands 34 so that through the channels between these ribs air may continue to pass away from the valve so long as pressure inside the tube is lowered by the exhaust side of the pump. These channels serve as bleeders for air so long as pressure at the inner face of the covering exceeds the pressure inside the tube. These check valves 27 are located near the ends of the chordwise grooves 26 where they underlie the tubes 23 and 25 and, when open, free a connecting path between the groove 26 and the tubes 23 and 25. When the tubes 23 and 25 are deflated, the air under the covering 10 will pass along the channels between the lands 19 to the grooves 26 and thence through the check valves 27 and the tubes 23 and 25 to the exhaust side of the pump and finally to the atmosphere. This arrangement makes for positive and certain elimination of air from the space between the airfoil 12 and the protective covering 10.

So long as the tubes 23 and 25 are maintained in deflated condition the check valve 27 remains open and the air may pass freely from the space between air foil and cover to the atmosphere. When, however, the timing controller connects the tubes to the compression side of the pump, pressure is built up under the tubes 23 and 25 greater in degree than exists between the airfoil and the cover. Under these circumstances the check valves 27 close and prevent any passage of air from the tubes and the valves remain closed until the pressure inside tubes 23 and 25 is again reduced at a specified time in the operating cycle by the exhaust action of the pump. The sealing of the margins 13, 14 and 16 of the cover to the surface of the airfoil will prevent entrance of air to the space between the airfoil and the covering. By the removal of air from this space a lower pressure beneath the covering than in its outer surface can be maintained and lifting or bulging of the covering is avoided.

In Fig. 5 modification is depicted in which the lands or ribs 19 are constructed to extend chordwise of the covering. The channels between these lands connect with grooves 35 extending spanwise of the wing. At intervals apertures and check valves 27 connect these spanwise grooves to the tubes 23 and 25. The elimination of air between the airfoil 12 and this form of covering is similar to that with the form in Fig. 5, first described. That is, the air passes along the channels to the grooves 35, then through the hole 28 and valve 27 into the tube 23 or 25 thence through the outlet tubes 30 to the exhaust side of the pump or other source of suction and finally to the atmosphere.

These and other variations may be made without departing from the scope of the invention as it is defined in the following claims.

I claim:

1. A protective covering for a surface subject to forces tending to lift the covering from the surface in the presence of air between the inner face of said covering and said surface, said covering comprising between its inner and outer faces a chamber for conducting air, and check valve means providing communication between said chamber and the inner face of the covering for flow of air from said inner face into said chamber and for checking flow in the reverse direction.

2. A protective covering for a surface subject to forces tending to lift the covering from the surface in the presence of air between the inner face of said covering and said surface, said covering comprising an inflatable portion providing a chamber for conducting air, and check valve means providing communication between said chamber and the inner face of the covering for flow of air from said inner face into said chamber and for checking flow in the reverse direction.

3. A protective covering for a surface subject to forces tending to lift the covering from the surface in the presence of air between the inner face of said covering and said surface, said covering comprising between its inner and outer faces a chamber for conducting air, the inner wall of said chamber having a passage through it connecting with the inner face of the covering, and a flap valve of resilient rubber-like material at said passage permitting flow of air from said inner face into said chamber and preventing flow in the reverse direction.

4. A protective covering for a surface subject to forces tending to lift the covering from the surface in the presence of air between the inner face of said covering and said surface, said covering having a grooved inner face and comprising between its inner and outer faces a chamber for conducting air, and valve means providing communication between said chamber and the grooved inner face of the covering for flow of air from said inner face into said chamber and for preventing flow in the reverse direction.

5. A protective covering for an airfoil, said covering having a grooved inner face and comprising between its inner and outer faces an inflatable tube having a passage through the wall of said tube connecting with the grooved inner face of the covering, and a flap valve of resilient rubber-like material at said passage, said valve permitting flow of air from said inner face into said tube and preventing flow in the reverse direction.

6. A protective covering for a surface subject to aerodynamic action tending to lift the covering from the surface in the presence of air between the inner face of said covering and said surface, said covering having a passage in its wall in communication with the inner face of the covering and means for permitting flow of air through the passage from said inner face while resisting flow in the reverse direction.

7. A protective covering for a surface subject to aerodynamic action tending to lift the covering from the surface in the presence of air between the inner face of said covering and said surface, said covering comprising an element of resilient rubber material separable from an adjacent surface of the covering to provide an opening for permitting flow of air from the inner face of the covering while tending to close resiliently to resist flow in the reverse direction.

WILLSON H. HUNTER.